United States Patent
Patridge (10) Patent No.: US 7,311,184 B2
(45) Date of Patent: Dec. 25, 2007

(54) CLUTCH/BRAKE ASSEMBLY WITH ELECTRICAL GENERATION SYSTEM

(75) Inventor: Arthur G. Patridge, Advance, NC (US)

(73) Assignee: North American Clutch Corporation, Milwaukee, WI (US)

( * ) Notice: Subject to any disclaimer, the term of this patent is extended or adjusted under 35 U.S.C. 154(b) by 0 days.

(21) Appl. No.: 11/251,021

(22) Filed: Oct. 14, 2005

(65) Prior Publication Data

US 2006/0087185 A1    Apr. 27, 2006

Related U.S. Application Data (60) Provisional application No. 60/619,645, filed on Oct. 18, 2004.

(51) Int. Cl.
*F16D 67/02* (2006.01)
*H02K 49/00* (2006.01)

(52) U.S. Cl. .................. 192/16; 56/10.7; 56/11.3; 180/65.4; 192/18 R (58) Field of Classification Search ..................... None
See application file for complete search history.

(56) References Cited

U.S. PATENT DOCUMENTS

| | | | |
|---|---|---|---|
| 4,141,439 A | 2/1979 | Lunde et al. | |
| 4,205,509 A | 6/1980 | Miyazawa et al. | |
| 4,226,313 A | 10/1980 | Meldahl et al. | |
| 4,372,433 A | 2/1983 | Mitchell et al. | |
| 4,377,224 A | 3/1983 | Takata et al. | |
| 4,511,023 A | 4/1985 | Nagai | |
| 4,524,853 A | 6/1985 | Nagai | |
| 4,538,712 A | 9/1985 | Nagai | |
| 4,951,769 A * | 8/1990 | Kawamura | 180/65.4 |
| 5,033,595 A | 7/1991 | Pardee | |
| 5,549,186 A | 8/1996 | Pardee | |
| 5,570,765 A | 11/1996 | Patridge | |
| 5,651,436 A | 7/1997 | Sommer | |
| 6,306,057 B1 * | 10/2001 | Morisawa et al. | 475/5 |
| 6,397,992 B1 | 6/2002 | Patridge | |
| 6,705,442 B1 | 3/2004 | Patridge | |
| 6,814,205 B2 * | 11/2004 | Feldhaus et al. | 180/165 |
| 6,827,188 B2 | 12/2004 | Patridge | |
| 2002/0104300 A1 * | 8/2002 | Hunt | 56/10.6 |
| 2004/0129465 A1 * | 7/2004 | Yamaguchi | 180/65.2 |
| 2004/0134175 A1 * | 7/2004 | Osborne | 56/10.6 |
| 2004/0244346 A1 * | 12/2004 | Inui et al. | 56/11.9 |

FOREIGN PATENT DOCUMENTS

WO    WO 03/053734 A1 *   7/2003

* cited by examiner

*Primary Examiner*—Rodney H. Bonck
(74) *Attorney, Agent, or Firm*—Michael Best & Friedrich LLP (57) ABSTRACT

A clutch assembly includes a rotatable input shaft, a clutch housing fixed relative to the input shaft, an input disk coupled to with the input shaft and rotatable therewith, and an output disk axially movable relative to the clutch housing to selectively engage the input disk. The clutch/brake assembly also includes an electrical generation system having a rotor shell coupled to the input shaft and rotatable therewith, a magnet coupled to the rotor shell, and a coil coupled to a coil support fixed relative to the rotor shell, wherein the coil is positioned with respect to the magnet to generate electrical current upon rotation of the rotor shell.

39 Claims, 6 Drawing Sheets

CLUTCH/BRAKE ASSEMBLY WITH ELECTRICAL GENERATION SYSTEM

CROSS-REFERENCE TO RELATED APPLICATION

This application claims priority from U.S. Provisional Patent Application No. 60/619,645, entitled "Modular Electrical Generation Device with Integral Clutch and Brake for Driving a Secondary Mechanical Load", filed Oct. 18, 2004 by Arthur G. Patridge.

BACKGROUND

The present invention relates to a clutch/brake assembly for mobile equipment, and in particular, a clutch/brake assembly including an integrated electrical generation system for driving a secondary mechanical load.

A variety of different industries use small mobile equipment for performing both utilitarian and recreational tasks, for example, lawn tractors, mowers, snow blowers, concrete crushers, mulchers, golf carts, or the like. Generally, these machines include an internal combustion engine that delivers power for use by the systems of the equipment through an extended rotating crankshaft. In many cases, the crankshaft provides rotary motion that is divided between two different systems within the equipment, an implement drive system and a wheel drive system.

The equipment's primary drive system directs power from the engine to a prime implement, and is often designed to be capable of transferring the engine's entire available horsepower capacity to the implement. The equipment's secondary drive system provides motive power to the wheels or tracks giving the equipment mobility. However, such equipment is often traction limited, and the wheel drive system can only utilize a small percentage of the engine's available horsepower. This system often provides the ability to connect and disconnect engine power to the wheels as well as to selectively vary the wheel drive speed and direction.

Other mobile equipment, including personal mobility aids, have a wheel drive system for low-power variable speed and direction that is based on using a direct-current, high-speed electric motor coupled to a mechanical gear reduction unit. These systems can be battery operated and rely on a "total loss" electrical supply, meaning the batteries are charged during periods of non-use and the battery current is consumed to depletion during the course of operating the machine. However, these wheel drive systems typically do not facilitate use of a high-capacity clutch or clutch/brake assembly capable of delivering power to an implement. Further, the wheel drive systems often require recharging between uses.

SUMMARY

In one embodiment, the invention provides a clutch assembly including a rotatable input shaft, a clutch housing fixed relative to the input shaft, an input disk coupled to the input shaft and rotatable therewith, and an output disk axially movable relative to the clutch housing to selectively engage the input disk. The clutch assembly also includes an electrical generation system having a rotor shell coupled to the input shaft and rotatable therewith, a magnet coupled to the rotor shell, and a coil coupled to a coil support fixed relative to the rotor shell, wherein the coil is positioned with respect to the magnet to generate electrical current upon rotation of the rotor shell.

In another embodiment, the invention provides a clutch assembly including a rotatable input shaft and a clutch housing fixed relative to the input shaft. A rotor shell is coupled to the input shaft and rotatable therewith, the rotor shell including a magnet coupled to the rotor shell and radially spaced apart from the input shaft. An electrical coil is coupled to a coil support and fixed relative to the rotor shell, the coil is positioned with respect to the magnet to generate electrical current upon rotation of the rotor shell. The rotating magnet generates an alternating current in the coil and the alternating current is delivered to a drive system external of the clutch/brake assembly. The clutch assembly also includes an input disk coupled to the input shaft and rotatable therewith, and an output disk selectively axially movable relative to the clutch housing and rotatable relative to the input shaft. The output disk is selectively axially movable between a first position, such that the output disk is disengaged from the input disk, and a second position, such that the output disk is engaged with the input disk. The input disk is selectively axially movable relative to the clutch housing between a first position, in which the input disk is disengaged from the output disk, and a second position, in which the input disk engages the output disk.

In yet another embodiment, the invention provides a mobile unit including a chassis, an engine for driving a remotely mounted implement, the engine including a crankshaft, and a clutch/brake assembly mounted co-axially to the crankshaft. The clutch assembly includes an input shaft rotatable with the crankshaft of the engine, a clutch housing fixed relative to the input shaft, an input disk coupled to the input shaft and rotatable therewith, and an output disk axially movable relative to the clutch housing to selectively engage the input disk. An electrical generation system of the clutch assembly includes a rotor shell coupled to the input shaft and rotatable therewith, the rotor shell including a magnet coupled to the rotor shell, and an electrical coil supported by a coil support fixed relative to the rotor shell, the coil positioned with respect to the magnet to generate electrical current upon rotation of the rotor shell. The rotating magnet generates an alternating current in the coil. The mobile unit also includes a regulator/rectifier assembly for receiving the alternating current from the electrical generation system and converting the alternating current to a direct current, and an electric motor interconnected to an object, wherein the electric motor uses the direct current for power.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
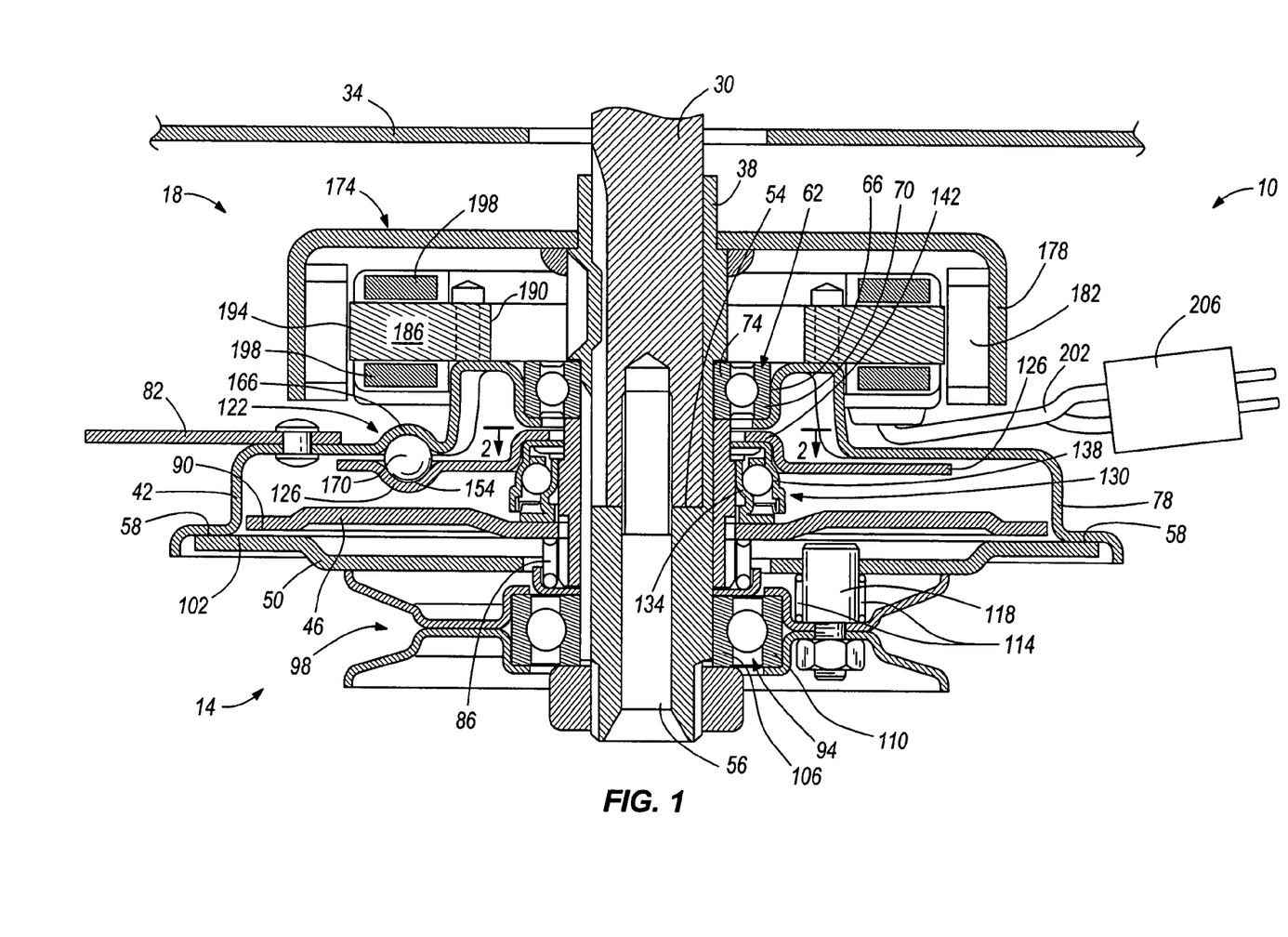
FIG. 1 is a sectional view of a drive system including a clutch/brake assembly with an electrical generation system according to an embodiment of the invention.

FIG. 1 illustrates a primary drive system 10 including a clutch/brake assembly 14 and integral electrical generation system 18 according to an embodiment of the invention. The drive system 10 provides a single device that divides power produced by an engine 22 (FIGS. 3 and 4) for use by a mechanical implement (not shown), driven by the clutch/brake assembly 14, and to simultaneously generate an ongoing supply of electricity by the electrical generation system 14 for use by a secondary drive system 26 (FIG. 4). For the purposes of illustration, the invention will be discussed in connection with a lawn mower.

The drive system 10 includes the clutch/brake assembly 14 mounted co-axially to an engine crankshaft 30 extending from an engine deck 34, or other power driven shaft, allowing the selective application of power to the remote implement (e.g., cutting blades, not shown). In FIG. 1, a brake of the clutch/brake assembly 14 is engaged and a clutch is disengaged, such that rotation of an interconnected implement is prevented. The clutch/brake assembly 14 includes an input shaft 38, or inner hub, a clutch housing 42, an input disk 46, and an output disk 50. The engine crankshaft 30 extends into the input shaft 38 to cause rotation of the input shaft 38 with the engine crankshaft 30. The crankshaft 30 is tightened to an inner shoulder 54 of the input shaft 38 by a bolt (not shown) that is threaded into an axial bore 56. In a further embodiment, other shaft-to-shaft and shaft-to-hub connections between the engine crankshaft 30 and the clutch/brake assembly 14.

The clutch housing 42 defines a braking surface 58 and is mounted relative to the input shaft 38 by a first bearing 62. The clutch housing 42 can be generally circular and can define an inner rim 66 fixed to an outer race 70 of the first bearing 62, while an inner race 74 of the first bearing 62 is fixed to the input shaft 38. This permits relative rotation between the input shaft 38 and the clutch housing 42. In the illustrated embodiment, the clutch housing 42 is stepped radially outward and axially downward to define an outer rim 78, which defines the downwardly facing annular braking surface 58. An anti-rotation strap 82 extends radially outward from the clutch housing 42 and is releasably secured to the clutch housing 42 by a rivet, although other known fasteners may be used. The anti-rotation strap 82 is fixed to the engine deck 34, which anchors the clutch housing 42, and thereby the braking surface 58, to the engine deck 34.

The input disk 46 is mounted to the input shaft 38 and extends radially outward therefrom, whereby the input disk 46 is rotatable with the input shaft 38. The input disk 46 is biased upward to a first position (shown in FIG. 1) by a first biasing spring 86 and away from the output disk 50, and is axially movable relative to the input shaft 38. The input disk 46 defines a downwardly facing contact surface 90 adjacent its outer periphery and concentric with and spaced inwardly from the braking surface 58.

The output disk 50 is mounted relative to the input shaft 38 by a second bearing 94 and extends radially outward from the input shalt 38. The output disk 50 is also coupled to a remote mechanical implement (nor shown) by an output pulley 98. An upwardly facing contact surface 102 defined on the output disk 50 is generally annular and is dimensioned such that an outer portion is generally coextensive with the braking surface 58 and an inner portion is generally coextensive with the contact surface 90 of the input disk 46. In another embodiment, the contact surface 102 of the output disk 50 includes a friction pad.

The output pulley 98 is mounted at the lower end of the input shaft 38 by the second bearing 94 and is held in position by the bolt (not shown) threaded into the bore 56 of the input shaft 38. An inner race 106 of the second bearing 94 is fixed to the input shaft 38 and an outer race 110 is fixed to the pulley 98. The first biasing spring 86 surrounds the input shaft 38 and engages the inner race 106 of the second bearing 94 and the input disk 46 for urging the input disk 46 upward.

The output disk 50 is biased upward to a first position (shown in FIG. 1) by a one or more second biasing springs 114 for engagement with the braking surface 58, such that the output disk 50 is axially movable relative to the input shaft 38. Drive pins 118 (only one is shown in FIG. 1) extend upwardly from the pulley 98 and through aligned holes in the output disk 50. The second biasing springs 114 are arranged about the drive pins 118 between a lower surface of the output disk 50 and the pulley 98 for urging the output disk 50 upward. As a result, the output disk 50 is coupled to the pulley 98 for rotation therewith, but is axially moveable relative to the input shaft 38.

Figure 2:
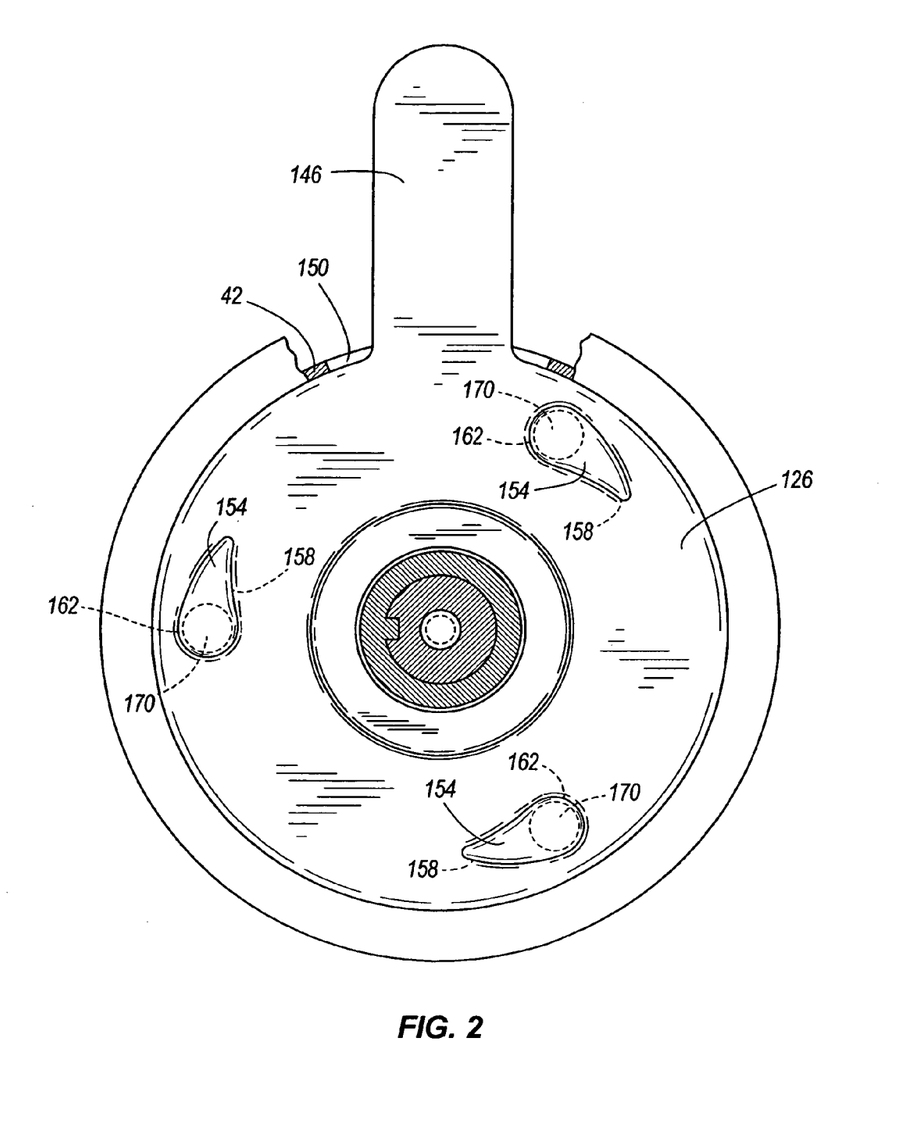
FIG. 2 is a sectional view of the clutch/brake assembly taken along line 2-2 of FIG. 1.

A cam assembly 122 is coupled to the input disk 46 and is moveable between a first position (shown in FIG. 1) and a second position wherein the input disk 46 is moved downwardly against the first biasing spring 86 and into engagement with the output disk 50. This in turn moves the output disk 50 downwardly so that the contact surface 102 is disengaged with the braking surface 58. In this mode, the output disk 50 is driven by the input disk 46. The cam assembly 122 includes a bearing cup 126 mounted for axial movement on the input shaft 38 by a third bearing 130. An inner race 134 of the third bearing 130 is fixed to the input shaft 38 for axial movement thereon and an outer race 138 is fixed to an inner rim 142 of the bearing cup 126. Referring to FIG. 2, an actuating arm 146, or operating handle, extends radially from the bearing cup 126 and through a slot 150 formed in the clutch housing 42. Arcuate grooves 154 are formed in the bearing cup 126 and each groove 154 tapers outwardly and downwardly from a narrow end 158 to a wide end 162. Complimentary grooves 166 are formed in the clutch housing 42 in an opposed relation to the grooves 154.

Cam balls 170 are disposed between the bearing cup 126 and the clutch housing 42 in each of the spaces defined by the opposed grooves 154, 166.

In FIG. 1, the clutch/brake assembly 14 is shown with the brake engaged and the clutch disengaged. The input disk 46 is biased to a first position by the first biasing spring 86 such that the input disk 46 freely rotates with the input shaft 38. The output disk 50 is biased to a first position by the second biasing springs 114 such that the contact surface 102 of the output disk 50 engages the braking surface 58 on the clutch housing 42 to prevent rotation of the output disk 50, and thereby the implement. The cam balls 170 of the cam assembly 122 are in the wide parts of the grooves 154, 166.

To power the implement, the actuating arm 146 is moved by the operator to a release position whereby the bearing cup 126 is rotated by pivoting the actuating arm 146. When the bearing cup is rotated 126, the grooves 154, 166 are no longer aligned, and the narrow end 158 of the groove 154 is adjacent the wide portion of the groove 166. In this manner, the bearing cup 126 is moved downward, forcing the input disk 46 downward, which overcomes the bias of the first spring 86 to axially move the input disk to a second position with the contact surface 90 engaging the contact surface 102 of the output disk 50. In addition, the output disk 50 is moved downward, which overcomes the bias of the second springs 114, to axially move the contact surface 102 of the output disk 50 away from the braking surface 58 to a second position. In the second position, the output disk 50 engages the input disk 46. During rotation of the input shaft 38 of clutch/brake assembly 14, the co-rotating input disk 46 imparts rotation to the output disk 50 and the output pulley 98, and thereby the connected implement, only upon engagement of the input disk 46 and the output disk 50.

To engage the brake, the operator moves the actuating arm 146 back to the initial position such that the bearing cup 126 is rotated. The grooves 154, 166 are moved into alignment so that the first spring 86 biases the input disk 46 upward out of engagement with the output disk 50 and the second springs 114 bias the output disk 50 upward into engagement with the braking surface 58. As a result, the springs 86, 114 bias the input disk 46 and the output disk 50 back to the respective first positions (shown in FIG. 1) whereby the input disk 46 rotates freely with the input shaft 38 and the output disk 50 engages the braking surface 58 to stop rotation of the output pulley 98 and the connected implement.

The drive system 10 also includes the electrical generation system 18, which is integral with the clutch/brake assembly 14, to generate an alternating current for use by the secondary drive system 26 while the input shaft 38 is rotating. The electrical generation system 18 includes a rotor shell 174 mounted to the input shaft 38 and extending radially outward therefrom. The rotor shell 174 rotates with the input shaft 38. The rotor shell 174 includes an axially extending flange 178 at a free end and a plurality of magnets 182 arranged along the flange 178. The magnets 182 are radially spaced apart from the input shaft 38. The electrical generation system 18 also includes a coil support 186 mounted to the clutch housing 42 and coupled thereto by a screw or other known fastener. The coil support 186 is stationary with the clutch housing 42 and relative to the input shaft 38. The coil support 186 includes a first end 190 positioned proximate the input shaft 38 and a second end 194 positioned proximate the flange 178 and magnets 182 of the rotor shell 174. The second end 194 of the coil support 186 is radially spaced apart from the magnets 182. A plurality of electrical coils 198 are arranged along the second end 194 of the coil support 186. The coil support 186 and the electrical coils 198 are positioned within the rotor shell 174.

In operation, the rotor shell 174 and magnets 182 rotate with the input shaft 38, and the coil support 186 and coils 198 remain stationary. Rotation of the magnets 182 relative to the coils 198 induces a current in the coils 198 as the magnets 182 pass, which results in usable levels of electrical power, as is known in the art. The resulting electrical power produced by the rotating magnets 182 and stationary electrical coils 198 takes the form of alternating current. The alternating current, i.e., electrical energy, is directed through wires 202 that extend from the electrical coils 198 to a plug 206 for delivering alternating current to the secondary drive system 26.

Figure 3:
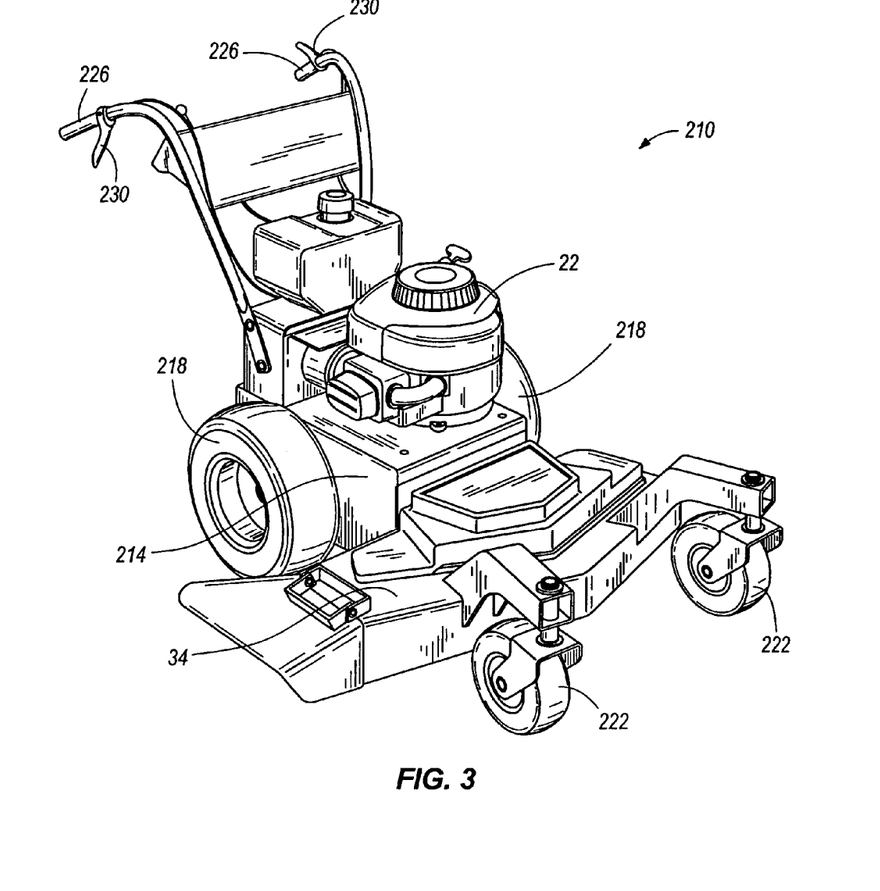
FIG. 3 is a perspective view of a walk-behind mower incorporating an embodiment of the invention.
Figure 4:
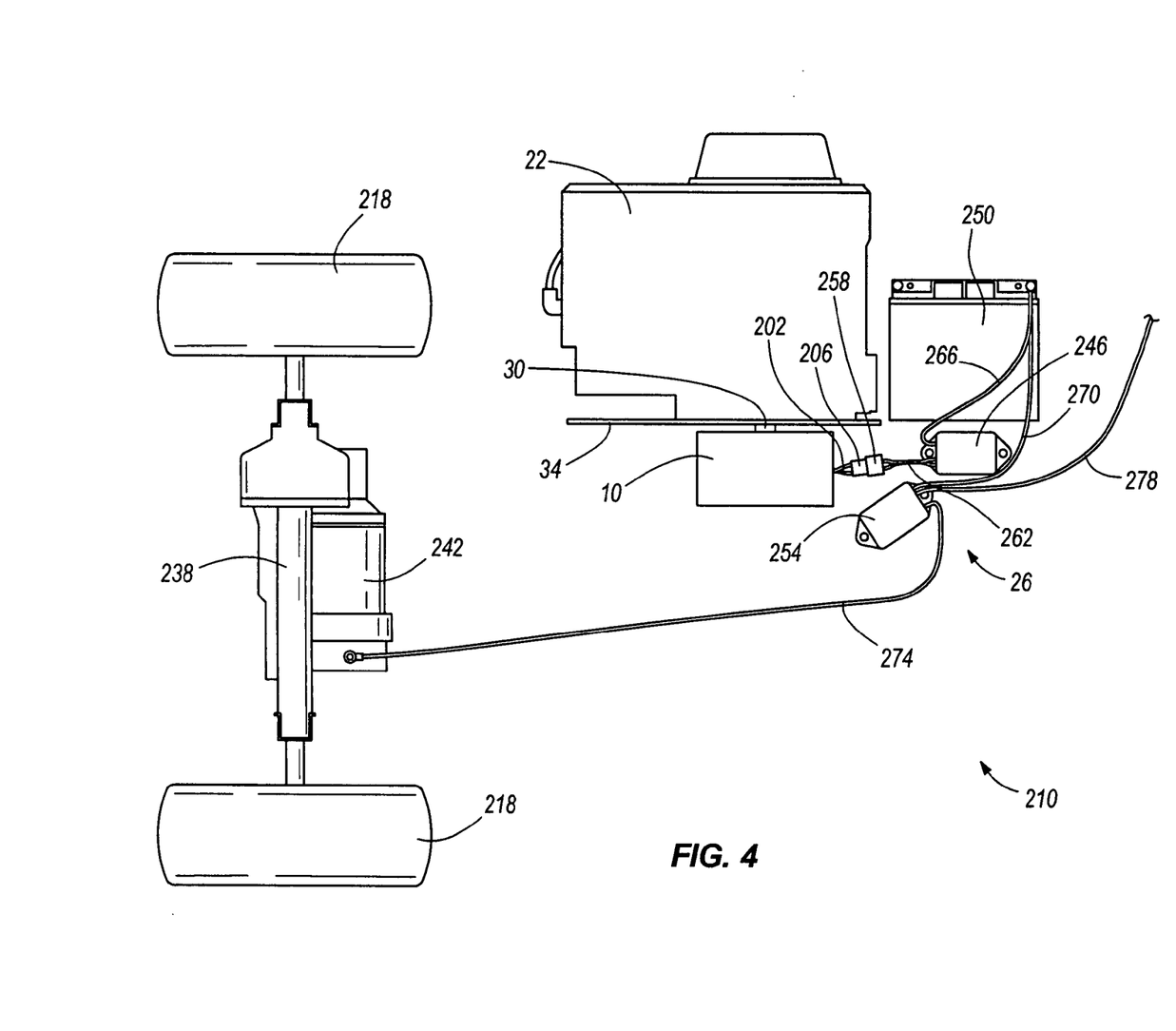
FIG. 4 is a schematic diagram of a mobile equipment unit incorporating a clutch/brake assembly with electrical generation system according to an embodiment of the invention.

FIG. 3 illustrates a walk-behind mower 210 that includes a primary drive system 10 according to an embodiment of the invention, and FIG. 4 is a schematic diagram of the walk-behind mower 210 including the first drive system 10 shown in FIG. 1 and the secondary drive system. The mower 210 includes a frame 214, or chassis, supported by a pair of drive wheels 218 and a pair of guide wheels 222, a mowing deck (not shown), the engine 22, push handles 226, and hand controls 230. The primary drive system 10 for powering a remotely mounted mower implement (e.g., mower blades) is housed within the frame 214 of the mower 210. As described above, the input shaft 38 of the clutch/brake assembly 14 is co-axially mounted to the engine crankshaft 30 of the engine 22 to rotate therewith. When the clutch is engaged in the clutch/brake assembly 14, the output disk 50 engages the input disk 46 such that rotation of the input shaft 38 is translated to the output disk 50 and the implement. For ease of illustration, the primary drive system in FIG. 4 is represented by a box.

The secondary drive system 26 within the mower 210 provides motive power to the drive wheels 218 using electrical energy generated by the electrical generation system 18 of the drive system 10. The secondary drive system 26 includes a gear transaxle 238 with an electric motor 242 for driving the drive wheels 218, a voltage regulator/rectifier 246, a battery 250, a controller 254, and the hand controls 230 (FIG. 3). As discussed above with respect to FIG. 1, in the electrical generation system 18 rotation of the magnets 182 relative to the coils 198 induces a current in the coils 198 as the magnets 182 pass. The resulting electrical power produced by the rotating magnets 182 and stationary electrical coils 198 takes the form of alternating current. As seen in FIG. 4, the alternating current, i.e., electrical energy, is directed through wires 202 that extend from the electrical coils 198 to the plug 206, which is inserted into a socket 258 connected to the regulator/rectifier 246 by wires 262. Alternating current is transferred to the regulator/rectifier 246 where the current is stabilized and converted to direct current for use by the electric motor 242.

In the illustrated embodiment, the regulator/rectifier 246 delivers conditioned direct current to the battery 250, via wires 266. The battery 250 serves as a buffer by accommodating short and intermittent peak loads in excess of an electrical output/generation capacity of the primary drive system 10. Direct current is supplied by the battery 250 to the controller 254, whereby the controller 254 supplies direct current to the electric motor 242 based upon control signals from the hand controls 230. Wires 270, 274, 278 connect the battery 250 to the controller 254, the controller 254 to the electric motor 242, and the hand controls 230 to the controller 254. The electric motor 242 uses the direct current to power the gear transaxle 238 and drive the drive wheels 218. Therefore, any time the mower engine 22 is running, power from the engine 22 is available to the input shaft 38, and thereby the electrical generation system 18. In further embodiments of the secondary drive system 26, the direct current from the regulator/rectifier 246 is supplied directly to the controller 254 or the electric motor 242 without being stored in the battery 250, or more than one battery may be used.

In the illustrated embodiment, the controller 254 controls the supply rate of the direct current from the battery 250 to the electric motor 242 based upon control signals from the hand controls 230 corresponding to a desired supply rate. In further embodiments, the supply rate may be pre-programmed or pre-selected with the controller 254. The electrical generation capacity of the primary drive system 10 is sized to provide current generation at a rate equal to or greater than overall consumption of the electric motor 242. Therefore, an on-going supply of electrical energy to power the electric motor 242 is provided, which eliminates the need to discontinue use of the mower 210 for recharging the battery 250. For example, the electrical generation capacity is determined based upon the number of windings or diameter of the electrical coils 198, the size or power of the magnets 182, and the rotating speed of the input shaft 38.

Figure 5:
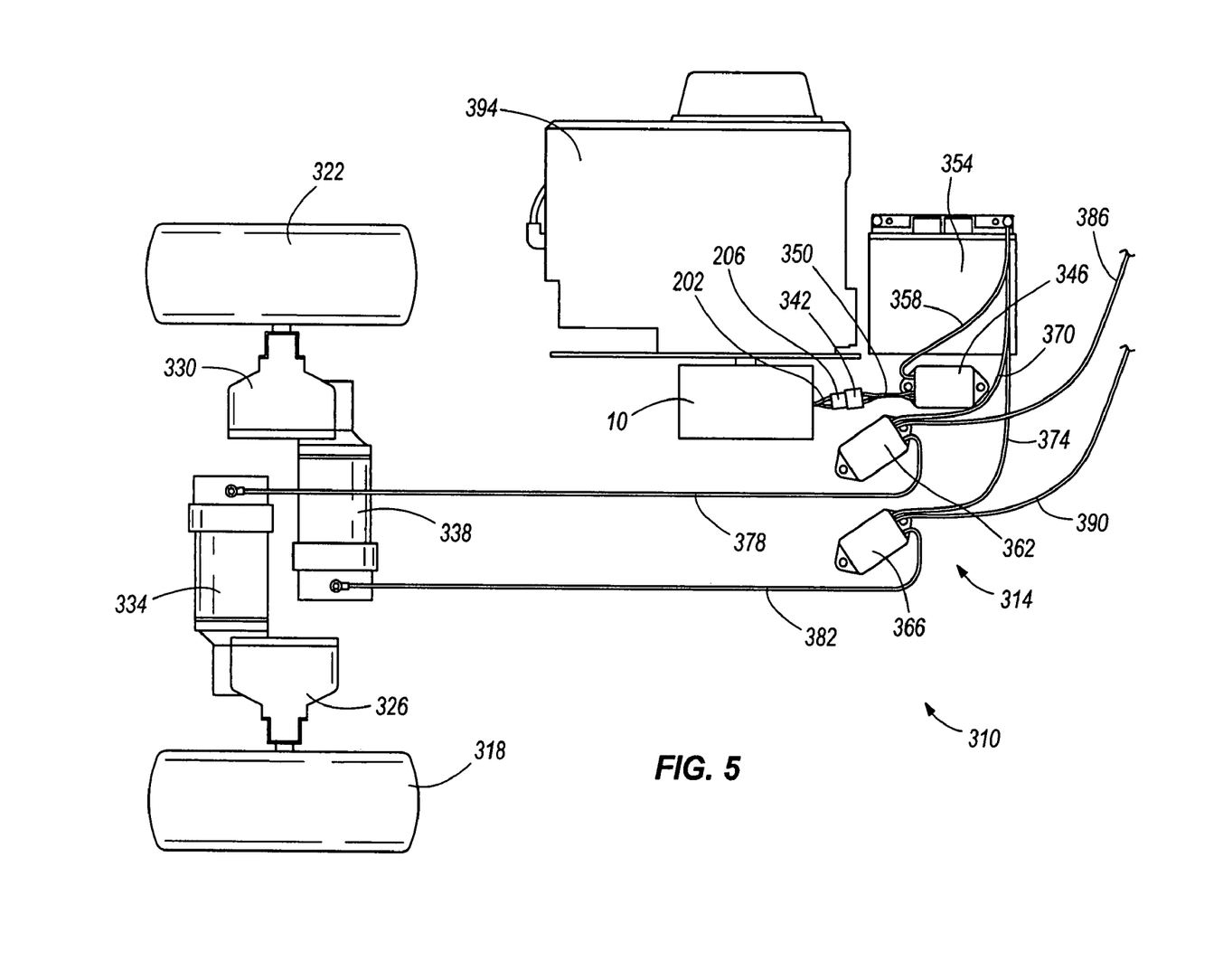
FIG. 5 is a schematic diagram of another embodiment of a mobile equipment unit with a split wheel drive incorporating a clutch/brake assembly with electrical generation system according to an embodiment of the invention.

FIG. 5 is a schematic diagram of another embodiment of a walk-behind mower. A mover 310 includes the primary drive system 10 (as described above) and a split wheel drive system 314. For ease of illustration, the primary drive system 10 in FIG. 4 is represented by a box. The mower 310 includes two drive wheels 318, 322. In the split wheel drive system 314 (otherwise referred to as a "split-path" or "dual" drive system), each of the drive wheels 318, 322 is independently controllable by a gear transaxle 326, 330 with an electric motor 334, 338. The split wheel drive system 314 allows a user to selectively vary wheel speed and forward or reverse direction of the mower 310. However, motion for each drive wheel 318, 322 is controlled independently and the operator is able to control the directional steering of the mower 310. For example, by causing the left-side wheel 318 to rotate at a faster speed than the right-side wheel 322, a right turn is induced on the mower 310. If the right-side wheel 322 is brought to zero speed and the left-side wheel 318 is rotated at any speed above zero, the mower 310 will turn about a vertical centerline of the right-side wheel 322. As another example, if the left-side wheel 318 is rotated in one direction at a given speed and the right-side wheel 322 is rotated in an opposite direction at the same speed, the mower 310 will turn about a vertical centerline of the mower 310. Similar effects are possible for inducing left turns with the mower 310.

The split wheel drive system 314 within the mower 310 provides motive power to the drive wheels 318, 322 using electrical energy generated by the electrical generation system 18 of the primary drive system 10. As discussed above with respect to FIGS. 1 and 4, in the electrical generation system 18, rotation of the magnets 182 relative to the electrical coils 198 induces a current in the coils 198 as the magnets 182 pass. The resulting electrical power produced by the rotating magnets 182 and stationary electrical coils 198 takes the form of alternating current. As seen in FIG. 5, the alternating current, i.e., electrical energy, is directed through wires 202 that extend from the electrical coils 198 to the plug 206, which is inserted into a socket 342 connected to a voltage regulator/rectifier 346 by wires 350. Alternating current is transferred to the regulator/rectifier 346 where the current is stabilized and converted to direct current for use by the electric motors 334, 338. The regulator/rectifier 346 delivers conditioned direct current to a battery 354, via wires 358. The battery 354 serves as a buffer by accommodating short and intermittent peak loads in excess of an electrical output/generation capacity of the primary drive system 10.

A left-side motor controller 362 is electrically connected to the electric motor 334 for the left-side drive wheel 318 and a left-side hand control (not shown), while a right-side motor controller 366 is electrically connected to the electric motor 338 for the right-side drive wheel 322 and a right-side hand control (not shown). Direct current is supplied by the battery 354 to the motor controllers 362, 366, whereby the controllers 362, 366 supply direct current to the associated electric motor 334, 338 based upon control signals from the hand controls. The battery 354 is connected to the controllers 362, 366, the controllers 362, 366 are connected to the electric motors 334, 338 by wires 378, 382, and the hand controls are connected to the controllers 362, 366. The electric motors 334, 338 use the direct current to power the gear transaxles 326, 330 and drive the drive wheels 318, 322. Therefore, any time an engine 394 of the mower 310 is running, power from the engine 394 is available to the input shaft 38, and thereby the electrical generation system 18. In further embodiments of the secondary drive system 314, the direct current from the regulator/rectifier 346 is supplied directly to the controllers 362, 366 or the electric motors 334, 338 without being stored in the battery 354, or more than one battery may be used Similar to the secondary drive system 26 of FIG. 4, the controllers 362, 366 of the split wheel drive system 314 control the supply rate of direct current from the battery 354 to the electric motors 334, 338 based upon control signals from the hand controls corresponding to a desired supply rate. The electrical generation capacity of the primary drive system 10 is sized to provide current generation at a rate equal to or greater than overall consumption of the electric motors 334, 338. Therefore, an on-going supply of electrical energy to power the electric motors 334, 338 is provided, which eliminates the need to discontinue use of the mower 310 for recharging the battery 354.

Figure 6:
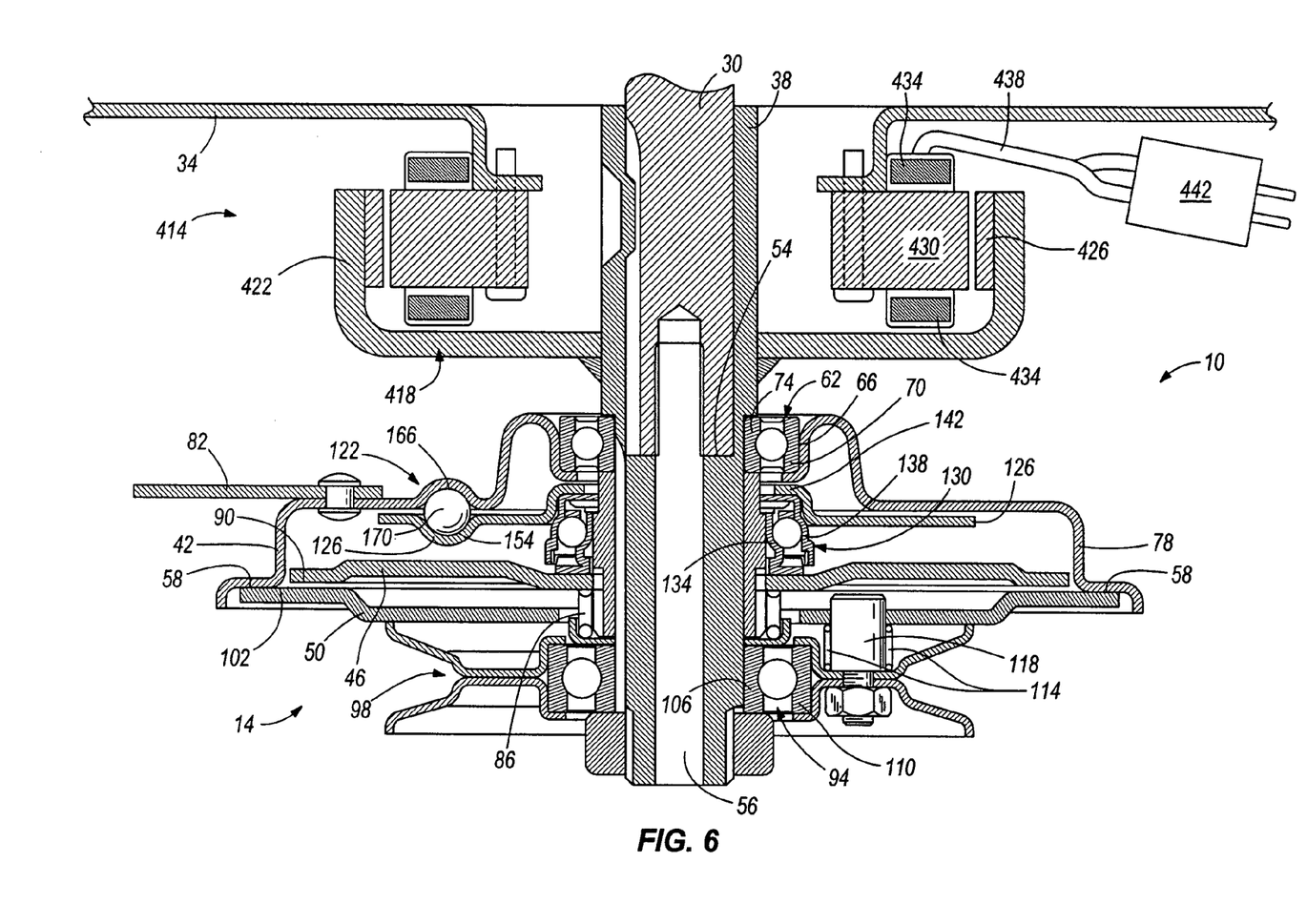
FIG. 6 is a sectional view of another embodiment of a drive system including the clutch/brake assembly with electrical generation system according to an embodiment of the invention.

FIG. 6 illustrates another embodiment of a primary drive system. A primary drive system 410 includes the clutch/brake assembly 14, as described above with respect to FIG. 1, and an electrical generation system 414. The electrical generation system 414 is integral with the clutch/brake assembly 14 to generate an alternating current for use by an electric motor (not shown), or secondary drive system, while the input shaft 38 is rotating. The electrical generation system 414 includes a rotor shell 418 mounted to the input shaft 38 and extending radially outward therefrom. The rotor shell 418 rotates with the input shaft 38. The rotor shell 418 includes an axially extending flange 422 at a free end, and a plurality of magnets 426 are arranged along the flange 422. The magnets 426 are radially spaced apart from the input shaft 38. The electrical generation system 414 also includes a coil support 430 mounted to the engine deck 34, or equipment frame, and coupled thereto by a screw or other known fastener. The coil support 430 is stationary relative to the input shaft 38 and is positioned radially inward and spaced apart from the magnets 426. A plurality of electrical coils 434 are arranged along the coil support 430. The coil support 430 and the electrical coils 434 are positioned within the rotor shell 418.

In operation, the rotor shell 418 and magnets 426 rotate with the input shaft 38, and the coil support 430 and coils 434 remain stationary. Rotation of the magnets 426 relative to the coils 434 induces a current in the coils 434 as the magnets 426 pass, which results in usable levels of electrical power, as is known in the art. The resulting electrical power produced by the rotating magnets 426 and stationary electrical coils 434 takes the form of alternating current. The alternating current, i.e., electrical energy, is directed through wires 438 that extend from the electrical coils 434 to a plug 442 for delivering alternating current to a secondary power system, as discussed above, remote from the primary drive system.

The clutch/brake assembly of either drive system 10, 410 may be comprised of one of many different forms, including pure mechanical, electromechanical, electromagnetic, pneumatic, hydraulic, or other various forms and combination of the above. In a further embodiment, the actuating arm 146 may be actuated in other known manners to engage and disengage the clutch.

It should be readily apparent to those of skill in the art that the drive systems 10, 410 may include a clutch-only assembly. In such configurations, in the first position the output disk would not engage the braking surface 58, but would be disengaged from the input disk 46 such that rotating is not imparted to the output disk 50 and the implement.

It should also be readily apparent to those of skill in the art, that the electrical generation systems may be used in a variety of different industries that utilize small mobile equipment for performing both utilitarian and recreational tasks, for example, lawn tractors, mowers, snow blowers, concrete crushers, mulchers, golf carts, or the like, including both walk-behind and ride-along versions.

Various features and advantages of the invention are set forth in the following claims.

What is claimed is:

1. A clutch assembly for mounting co-axially with an engine crankshaft, the clutch assembly comprising:
   a clutch housing;
   an input shaft rotatable with the crankshaft and relative to the clutch housing;
   an input disk coupled to the input shaft and rotatable therewith;
   an output disk axially movable relative to the clutch housing to selectively engage the input disk upon manual actuation by an operator; and
   an electrical generation system including a rotor shell coupled to the input shaft and rotatable therewith, a magnet coupled to the rotor shell, and a coil positioned with respect to the magnet to generate electrical current upon rotation of the rotor shell, wherein the electrical generation system and the input shaft are disposed at a first end of the crankshaft.

2. The clutch assembly of claim 1 wherein a plurality of magnets are arranged along the rotor shell.

3. The clutch assembly of claim 1 wherein a plurality of wound coils are arranged along a coil support.

4. The clutch assembly of claim 1 wherein the rotating magnet generates an alternating current in the coil and the alternating current is delivered to a drive system external to the clutch assembly.

5. The clutch assembly of claim 4 wherein the alternating current is converted to direct current and delivered to a battery.

6. The clutch assembly of claim 4 wherein the alternating current is converted to direct current and delivered to an electric motor.

7. The clutch assembly of claim 1 wherein the output disk is movable between a first position in which the output disk is disengaged from the input disk and a second position in which the output disk engages the input disk.

8. The clutch assembly of claim 7 wherein in the first position the output disk engages a braking surface defined on the clutch housing.

9. The clutch assembly of claim 7 wherein the output disk is biased to the first position by a spring.

10. The clutch assembly of claim 1 wherein the input disk is axially movable relative to the dutch housing to selectively cause the output disk to engage the input disk.

11. The clutch assembly of claim 10 wherein the input disk is biased to a first position by a spring, in which the input disk is disengaged from the output disk.

12. The clutch assembly of claim 1, and further comprising an actuating arm coupled to the clutch housing for selectively causing axial movement of the output disk.

13. The clutch assembly of claim 1 wherein a remotely mounted implement is interconnected with the output disk.

14. A clutch assembly for mounting co-axially with an engine crankshaft comprising:
   a clutch housing;
   an input shaft rotatable with the crankshaft and relative to the clutch housing;
   a rotor shell coupled to the input shaft and rotatable therewith, the rotor shell including a magnet coupled to the rotor shell and radially spaced apart from the input shaft, wherein the rotor shell and the input shaft are disposed at a first end of the crankshaft;
   an electrical coil positioned with respect to the magnet to generate electrical current upon rotation of the rotor shell,
   wherein the rotating magnet generates an alternating current in the coil and further wherein the alternating current is delivered to a drive system external of the clutch assembly;
   an input disk coupled to the input shaft and rotatable therewith; and
   an output disk axially movable relative to the clutch housing upon manual actuation by an operator, the output disk being rotatable relative to the input shaft,
   wherein the output disk is selectively axially movable between a first position, such that the output disk is disengaged from the input disk, and a second position, such that the output disk is engaged with the input disk, and
   further wherein the input disk is selectively axially movable relative to the clutch housing between a first position, in which the input disk is disengaged from the output disk, and a second position, in which the input disk engages the output disk.

15. The clutch assembly of claim 14 wherein a plurality of magnets are arranged along the rotor shell.

16. The clutch assembly of claim 14 wherein a plurality of wound electrical coils are arranged along a coil support.

17. The clutch assembly of claim 14 wherein the alternating current is converted to direct current and delivered to a battery.

18. The clutch assembly of claim 14 wherein the alternating current is converted to direct current and delivered to an electric motor.

19. The clutch assembly of claim 14 wherein when the output disk is in the first position, the output disk engages a braking surface defined by the clutch housing.

20. The clutch assembly of claim 14 wherein the output disk is biased to the first position by a spring.

21. The clutch assembly of claim 14 wherein the input disk is biased to the first position by a spring.

22. The clutch assembly of claim 14, and further comprising a lever coupled to the clutch housing for selectively causing axial movement of the input disk and the output disk.

23. The clutch assembly of claim 14 wherein a remotely mounted implement is interconnected with the output disk.

24. A mobile unit comprising:
a chassis;
an engine for driving a remotely mounted implement, the engine including a crankshaft;
a clutch assembly mounted co-axially to the crankshaft, the clutch assembly including
a clutch housing;
an input shaft rotatable with the crankshaft of the engine relative to the clutch housing,
an input disk coupled to the input shaft and rotatable therewith,
an output disk axially movable relative to the clutch housing to selectively engage the input disk upon manual actuation by an operator, and
an electrical generation system including a rotor shell coupled to the input shaft and rotatable therewith, the rotor shell including a magnet coupled to the rotor shell, and an electrical coil supported by a coil support that is stationary with respect to the clutch housing, the coil positioned with respect to the magnet to generate electrical current upon rotation of the rotor shell, wherein the rotating magnet generates an alternating current in the coil;
a regulator/rectifier assembly for receiving the alternating current from the electrical generation system and converting the alternating current to a direct current; and
an electric motor interconnected to an object, wherein the electric motor uses the direct current for power,
wherein the input shaft and the rotor shell of the electrical generation system are disposed at a first end of the crankshaft.

25. The mobile unit of claim 24 wherein the implement is interconnected with the output disk.

26. The mobile unit of claim 24 wherein the object is a gear transaxle for driving a pair of wheels.

27. The mobile unit of claim 24, and farther comprising a battery electrically coupled to the regulator/rectifier assembly and the electric motor, wherein the battery stores the direct current from the regulator/rectifier assembly and supplies the direct current to the electric motor.

28. The mobile unit of claim 27, and further comprising a unit controller electrically coupled to the battery and the electric motor, wherein the unit controller controls a supply rate of the direct current from the battery to the electric motor.

29. The mobile unit of claim 24, and further comprising a unit controller electrically coupled to the regulator/rectifier assembly and the electric motor, wherein the unit controller controls a supply rate of the direct current from the regulator/rectifier assembly to the electric motor.

30. The mobile unit of claim 29, and further comprising an operator control for delivering a signal to the unit controller corresponding to a desired supply rate.

31. The mobile unit of claim 24 wherein the electric motor is a first electric motor interconnected with a first object and uses the direct current, and further comprising a second electric motor interconnected to a second object, wherein the second electric motor uses the direct current.

32. The mobile unit of claim 31 wherein the first and second objects are first and second gear transaxles for driving a pair of drive wheels, each gear transaxle driving one of the wheels.

33. The mobile unit of claim 31, and further comprising a first unit controller electrically coupled to the regulator/rectifier assembly and the first electric motor and a second unit controller electrically coupled to the regulator/rectifier assembly and the second electric motor, wherein the unit controllers control a supply rate of the direct current from the regulator/rectifier assembly to the electric motors.

34. The mobile unit of claim 24 wherein a current output capacity of the electrical generation system provides current at a rate greater than or equal to average current consumption of the electric motor.

35. The mobile unit of claim 24 wherein when the output disk engages the input disk, rotary motion is translated to the implement.

36. The mobile unit of claim 24 wherein the coil support is mounted to the clutch housing.

37. The mobile unit of claim 24 wherein the coil support is mounted to the chassis.

38. The mobile unit of claim 24 wherein the output disk is movable between a first position in which the output disk engages a braking surface defined on the clutch housing and a second position in which the output disk engages the input disk.

39. A clutch assembly for mounting co-axially with an engine crankshaft, the clutch assembly comprising:
a clutch housing;
an input shaft rotatable with the crankshaft and relative to the clutch housing;
an input disk coupled to the input shaft and rotatable therewith;
an output disk axially movable relative to the clutch housing to selectively engage the input disk, the output disk being coupled to a mower blade; and
an electrical generation system including a rotor shell coupled to the input shaft and rotatable therewith, a magnet coupled to the rotor shell, and a coil positioned with respect to the magnet to generate electrical current upon rotation of the rotor shell, wherein the electrical generation system and the input shaft are disposed at a first end of the crankshaft.

* * * * *

UNITED STATES PATENT AND TRADEMARK OFFICE
CERTIFICATE OF CORRECTION

PATENT NO. : 7,311,184 B2 Page 1 of 1
APPLICATION NO. : 11/251021
DATED : December 25, 2007
INVENTOR(S) : Arthur G. Patridge It is certified that error appears in the above-identified patent and that said Letters Patent is hereby corrected as shown below:

Claim 10, col. 10 line 7: the word "dutch" should be --clutch--:

...is axially movable relative to the dutch housing to selec-...

Claim 27, col. 11 line: the word "farther" should be --further--:

...The mobile unit of claim 24, and farther comprising...

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,311,184 B2  Page 1 of 1
APPLICATION NO. : 11/251021
DATED : December 25, 2007
INVENTOR(S) : Arthur G. Patridge It is certified that error appears in the above-identified patent and that said Letters Patent is hereby corrected as shown below:

Claim 10, col. 10 line 7: the word "dutch" should be --clutch--:

...is axially movable relative to the dutch housing to selec-...

Claim 27, col. 11 line 42: the word "farther" should be --further--:

...The mobile unit of claim 24, and farther comprising...

This certificate supersedes the Certificate of Correction issued July 29, 2008.

Signed and Sealed this

Twenty-sixth Day of August, 2008

JON W. DUDAS
*Director of the United States Patent and Trademark Office*